(12) United States Patent
Barajas Gonzalez et al.

(10) Patent No.: US 9,821,232 B2
(45) Date of Patent: Nov. 21, 2017

(54) PERSONA-BASED MULTIPLAYER GAMING

(71) Applicant: INTERNATIONAL BUSINESS MACHINES CORPORATION, Armonk, NY (US)

(72) Inventors: Emmanuel Barajas Gonzalez, Guadalajara (MX); Shaun E. Harrington, Sahuarita, AZ (US); Benjamin K. Rawlins, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 149 days.

(21) Appl. No.: 14/820,654

(22) Filed: Aug. 7, 2015

(65) Prior Publication Data

US 2017/0036115 A1   Feb. 9, 2017

(51) Int. Cl.
*G06F 17/00* (2006.01)
*A63F 13/67* (2014.01)
*A63F 13/825* (2014.01)
*A63F 13/215* (2014.01)
*G06F 3/01* (2006.01)
*A63F 13/798* (2014.01)

(52) U.S. Cl.
CPC .......... *A63F 13/67* (2014.09); *A63F 13/215* (2014.09); *A63F 13/798* (2014.09); *A63F 13/825* (2014.09); *G06F 3/015* (2013.01)

(58) Field of Classification Search
USPC ....................................... 463/30–33
See application file for complete search history.

(56) References Cited

U.S. PATENT DOCUMENTS

| | | | |
|---|---|---|---|
| 6,361,438 B1 * | 3/2002 | Morihira ............. | A63F 13/10 345/473 |
| 7,090,576 B2 | 8/2006 | Herbrich et al. | |
| 7,785,197 B2 * | 8/2010 | Smith ................ | A63F 13/12 463/30 |
| 8,678,894 B2 | 3/2014 | Thomas et al. | |
| 8,951,124 B2 * | 2/2015 | Hussman ............ | A63F 13/31 463/31 |
| 8,956,218 B2 * | 2/2015 | Ducheneaut ........ | G07F 17/326 463/23 |
| 2006/0154710 A1 | 7/2006 | Serafat | |
| 2012/0010734 A1 | 1/2012 | Youm | |
| 2013/0215116 A1 * | 8/2013 | Siddique ............ | G06Q 30/0643 345/420 |
| 2014/0128166 A1 * | 5/2014 | Tam ................... | A63F 13/12 463/42 |

* cited by examiner

*Primary Examiner* — Ronald Laneau
(74) *Attorney, Agent, or Firm* — Griffiths & Seaton PLLC

(57) ABSTRACT

Embodiments for fostering integration of a user in a multi-player gaming environment by a processor. Each of a plurality of user bioanalytics is recorded over a period of time as the user interacts in the multi-player gaming environment. The recorded bioanalytics are compared against a plurality of game analytics corresponding to aspects of game play in the multi-player gaming environment over the period of time. Based on the bioanalytics and game analytics, an avatar representation of the user is constructed for the multi-player gaming environment.

15 Claims, 4 Drawing Sheets

PERSONA-BASED MULTIPLAYER GAMING

BACKGROUND OF THE INVENTION

Field of the Invention

The present invention relates in general to computers, and more particularly to, various embodiments for persona-based multiplayer gaming.

Description of the Related Art

With modern gaming, graphics, concepts, even sounds have increased dramatically in complexity over the years. Many games today involve the complex processing of video information, complex computational operations to accurately place the gamer in a particular dynamic gaming environment, and other complex tasks. While many aspects have grown exponentially in complexity, some aspects, alternatively, have not kept up.

SUMMARY OF THE INVENTION

Various embodiments for fostering integration of a user in a multi-player gaming environment by a processor are provided. In one embodiment, by way of example only, a method for fostering integration of a user in a multi-player gaming environment by a processor is provided. Each of a plurality of user bioanalytics is recorded over a period of time as the user interacts in the multi-player gaming environment. The recorded bioanalytics are compared against a plurality of game analytics corresponding to aspects of game play in the multi-player gaming environment over the period of time. Based on the bioanalytics and game analytics, an avatar representation of the user is constructed for the multi-player gaming environment.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
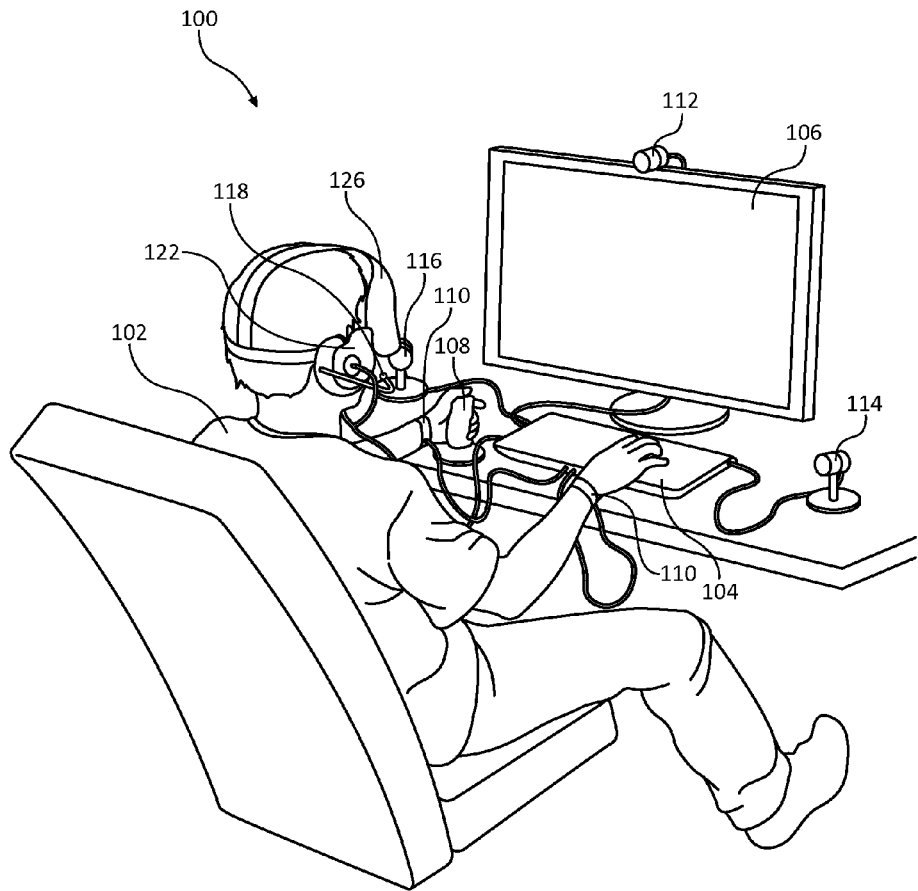
FIG. 1 is an illustration of a multi-player gaming environment, in which various aspects of the present invention may be realized.

With modern gaming, as previously mentioned, graphics, concepts, even sounds have increased dramatically in complexity over the years. However, Artificial Intelligence (A.I.) aspects of gaming environments have relatively stayed the same. From the beginnings of video gaming (e.g., the game "Pong") an A.I. was developed to enable the game to "play back" with the user. Although these early A.I.'s would be considered primitive in comparison with modern A.I. concepts, essentially the original concept remains.

The original concept as described previously generally encompasses the following. A game developer, or team of developers, sit down and determine what happens to the user if the user does action X, for example, and how the game will attempt, for example, to counter the user's action X.

With enhancements to modern games and A.I. in general, there are capabilities that can be applied to today's gaming, particularly multiple player (or multi-player) environments. Now, for example, instead of waiting your turn to drive the yellow circle away from the ghosts, the user can now play in parallel with other users. In these multi-player environments, the users may share collective goals in which each of the players works as to collectively accomplish. Alternatively, for example, the users may work against each other collectively in a similar manner to accomplish certain individual goals.

A key challenge in multi-player environments is the necessity of an additional user to share the gameplay experience with. Accordingly, as an example, game "centers" have grown up to allow teams of users to collectively play live against each other to achieve a certain multi-player experience. In addition, a challenge with A.I. development concerns the fact that the developer does not know who a particular user is playing with, or perhaps more importantly, who the instant user is. Instead, the A.I. development process may be simply coding resistance or support, and some users may never receive the full experience that human beings offer by simply engaging in game play with the computer. In short, there is currently no mechanism to partake in multi-player benefits in gaming environments that the user receives by playing with another live human being, without playing with another live, human being.

To address the foregoing, the following illustrated embodiments implement mechanisms for producing, among other functionality, persona-based avatars that a user may interact with in a gaming environment. These avatars are based, in one embodiment, upon a prior user's play styles. By monitoring prior play styles, the mechanisms of the illustrated embodiments record, and analyze, a particular user's game play, so that the analyzed game play can then begin to predict and recreate the particular user's game playing style.

Continuing the mechanisms of the illustrated embodiments further, at a subsequent time, if the particular user is not able to directly participate in the gaming environment, the created avatar may simply be located, and loaded into the game. As a result, any user may then take advantage of the particular user's multi-player style in the gaming environment. For example, an additional user may play against the avatar recreation of the particular user. Or the particular user may use his avatar such that he is playing against himself, so-to-speak. As one of ordinary skill in the art will appreciate, once an avatar representation of the particular user is created, the avatar representation may be implemented into a host of particular gaming scenarios for various benefits.

In view of the foregoing, a variety of multi-player scenarios may then be implemented by the mechanisms of the illustrated embodiments to leverage the particular user in a gaming environment, with or without the user's direct participation. Further, these multi-player scenarios may be implemented without the necessity of a gaming development team creating and tailoring the user experience around their idea of what the game play should be. Rather, the users/players in the gaming environment retain the control to make these determinations. In addition, these avatar creations may later be shared to other systems, other games, other users, and other environments, or even purchased, such that other individuals can enjoy the experience of game play against other players that the individuals may not have typical access.

The mechanisms of the illustrated embodiments implement several portions of functionality to accomplish various aspects of the present invention. This functionality, as will be further described, includes a data capture function, an analysis function, and a usage function; each of these portions of functionality contributes to the overall invention as will be described.

The data capture functionality implemented by various embodiments of the present invention, may (among other functionality) be thought to accomplish a variety of purposes in furtherance of the present invention. In one embodiment, the game play of a particular user is recorded. As will be seen, this recording embodiment may encompass a variety of techniques, and/or involve a variety of hardware and/or software. One goal of the data capture process is to provide as much data as possible about the particular user's interaction with the gaming environment for later analysis. As such, this data may include data obtained from reactions, controller movements, play style (e.g., is the particular player aggressive or passive), biometric information such as auditory or sensory information, and even humor (e.g., data obtained from the user to indicate their emotional response to the gaming environment).

In view of the foregoing, in one exemplary embodiment, various biometric devices may record auditory information such as verbal cues, phrases, laughter, and even (as one of ordinary skill in the art will appreciate) nonverbal cues such as facial expressions, emotional responses, and the like. For example, various biometric sensors may be configured to monitor the emotional intensity and/or mood of the particular user as the game unfolds.

In one embodiment, the data collected from the particular user may measure how the user reacts to particular gaming scenarios in the gaming environment as a game unfolds. These reactions may be added to the other data to obtain a complete representation of how the particular user interacts in the gaming environment. Furthermore, the data may be compared against particular metrics of the game environment itself to gauge relative differences between the particular user and another user's interaction in the particular gaming environment.

To further illustrate an exemplary embodiment for performing data capture functionality, FIG. 1, following, illustrates an exemplary gaming environment 100 in which various aspects of the illustrated embodiments may be implemented. In the gaming environment 100 shown, a user/player 102 is seated. A gaming console 110 provides the hardware component(s) for the gaming software, data collection, analysis, and shared functionality of various aspects of the illustrated embodiments as will be further described.

Various peripheral devices may be connected to gaming console 110 as one of ordinary skill in the art might appreciate. A graphical user interface (GUI) 106 is shown, which may render video information that the user 102 sees. The user 102 may use/implement joystick 108 to provide control information in the gaming environment for, for example, movement of a virtualized person throughout the environment.

A variety of sensors (biometric and otherwise, cameras, and data collection devices are shown attached to the gaming console 110. As a first example biometric wrist sensor 110 may be attached to each of the user 102's wrists, to, for example, record various biometric information (e.g., pulse, heart rate, breathing rate, and the like).

In addition to biometric sensors 110, a camera 112 may be trained on the user 102's face to collect facial recognition features (e.g., to identify the user or collect data representative of facial cues the user 102 provides as the user navigates the gaming environment 100). An additional camera 114 is connected to the gaming console 104 and may be configured to provide additional biometric or other visual information. For example, the camera 114 may be an infrared camera designed to monitor the body temperature of the user 102 as the user 102 navigates the gaming environment 100. In addition to cameras 112 and 114, an additional camera 116 may also be trained on another portion of the user 102 to record visual cues.

A microphone 118 is shown connected to the gaming console 104. The microphone 118 may monitor the user 102 and record auditory cues, such as language, phrasing, emotional cues such as laughter, and the like. An additional biometric sensor 122 may be coupled to the user 102's head to record biometric information such as brainwaves. Finally, an additional sensor 126 may be mounted to a headset device in order to monitor eye movement of the user 102. As one of ordinary skill in the art will appreciate, a variety of sensory devices may be used in a specific implantation or to obtain specific information in regards to a particular user in a certain gaming environment.

Figure 2:
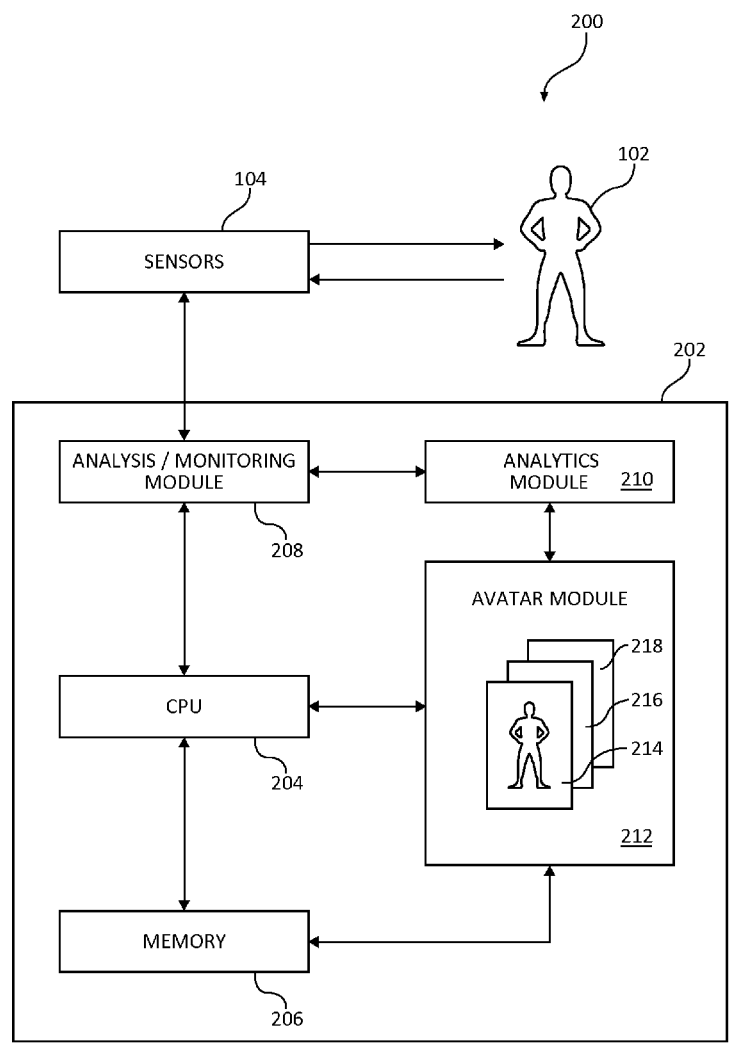
FIG. 2 is a block diagram of an exemplary representation of a computing multi-player gaming environment including various biometric sensors in communication with a user, an analysis module, Central Processing Unit (CPU), memory, and avatar module, here again in which aspects of the present invention may be realized.

Turning now to FIG. 2, a block diagram of various hardware 200 implemented to accomplish various aspects of the illustrated embodiments, is depicted. The hardware 200 includes hardware unit 202, in bidirectional communication with the various sensors 104 previously described. The various sensors are thereby in bidirectional communication with the user 102 as shown.

Examining the hardware unit 202 further, various modules are incorporated to accomplish certain functionality according to aspects of the present invention. Each of the certain functionality will be further described, following. First, an analysis/monitoring module 208 receives and/or sends data to the various sensors 104 in the gaming environment. The analysis/monitoring module 208 is in communication with a central processing unit (CPU) 204, as well as memory 206.

In addition to the foregoing, an analytics module 210 is shown connected to an avatar module 212, with various avatars 214, 216, and 218 corresponding to particular users in the gaming environment. In one embodiment, the analytics module 210 observes various aspects of a particular gaming environment and studies the relationship between the user 102 and the particular game play underway. The hardware unit 202 may contain data pertaining to a particular game, that is stored in memory 206 or elsewhere. For example, the data may include information that indicates that any player faces a monumental decision at a certain geographical location in the game, requiring a decision to be made by the user 102. The analytics module 210, in combination with the analysis module 208, and other components, may observe and record the particular user 102's reaction to the monumental decision, comparing the user 102's reaction with other users' reactions, and, for example, the modules' own predictions about what the user 102's reaction would be.

Examining avatar module 212 further, the avatar module may, in combination with analysis/monitoring module 208 and analytics module 210, use various information recorded from the user 102 (e.g., biometric data, user reactions, verbal and nonverbal cues, visual cues, and the like) to begin to construct an avatar representation (e.g., avatars 214, 216, or 218) for the particular user 102. Such avatar 214, 216, and 218 then becomes the accumulation of various data, responses, and predictive information to construct a virtualized personality of the user 102 in the particular gaming environment. The various avatars 214, 216, and 218 may be stored in memory 206, elsewhere in the hardware unit 202, or as one of ordinary skill in the art will appreciate, on another hardware unit in a local or remote location, or elsewhere.

A brief discussion as to further analytics functionality provided by various components (e.g., 204, 206, 208, and 210) in the hardware unit 202 (or otherwise, according to various embodiments of the present invention) is of further use. In one embodiment, based upon the monitoring of the gaming environment, in conjunction with various aspects of the gameplay itself, the various components and modules may implement decision-making functionality based on scenarios that unfolded per the system's expectations (what worked), scenarios that unfolded differently than the system's expectations (what didn't work), and furthermore, how each of the scenarios affected the user (e.g., how did the scenarios make the user feel).

In an additional embodiment, the various components in hardware unit 202 or elsewhere may be configured to monitor multiple-users at one time. Additionally, the various components may continue to implement a "learning" functionality such that over time, the various responses of the user 102 continue to be studied and analyzed, and various determinations about the user 102 may be adjusted accordingly.

The components of hardware unit 202 may, based on prior game play, develop and determine common trends that the user takes part. Consider the following example. At a certain point in the gaming environment, it may be determined that the user 102 always "hugs a wall" structure, or always "charges into" a structure. These observations and trends may then be later recorded and applied to the avatar representation of the user 102 so as to describe particular aspects of the persona, play style, and/or personality of the user 102.

Figure 3:
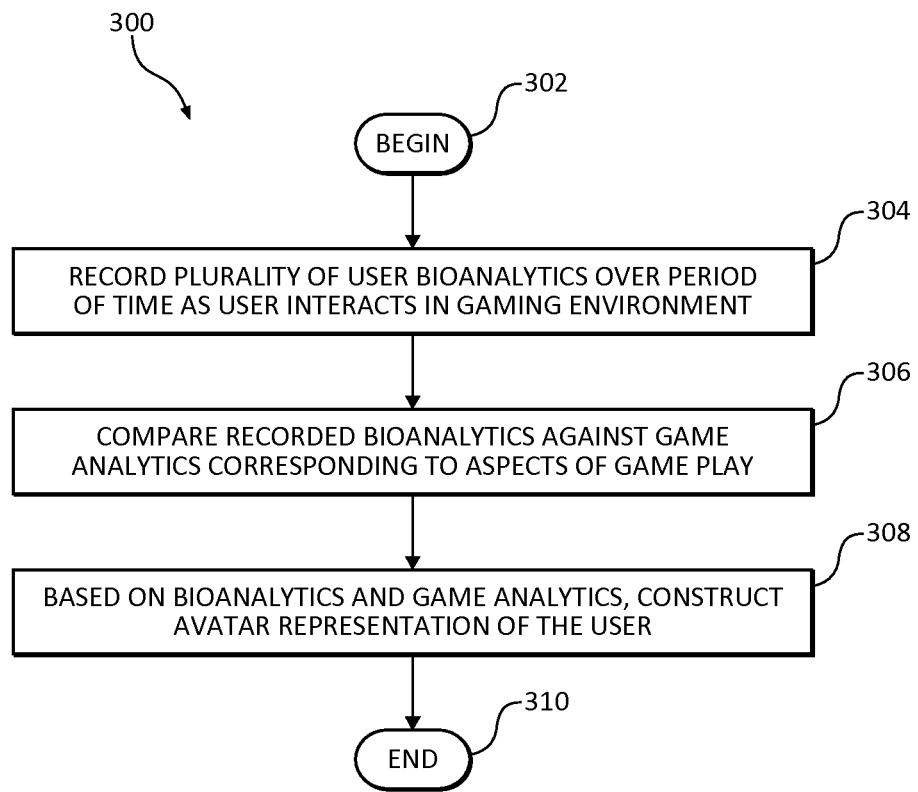
FIG. 3 is a flow chart diagram of an exemplary method for fostering integration of a user in a multi-player gaming environment, again in which various aspects of the present invention may be implemented.

Turning now to FIG. 3, a flow chart diagram of an exemplary method 300 for fostering integration of a user in a multi-player gaming environment by a processor, according to one embodiment of the present invention, is depicted. Method 300 begins (step 302) with the recording of a plurality of user bioanalytics over a period of time as the user interacts in and within the gaming environment (step 304). Use of the term "bioanalytic" is intended to refer to any data, biometric or otherwise, that would provide relevant information as to the behavior of a particular user in a gaming environment. Bioanalytics may also refer to assessment, decision, or predictive information that is formulated by the mechanisms of the present invention to describe user behavior in some way.

Once the various user bioanalytics are recorded, the bioanalytics are compared against various game analytics that correspond to various aspects of particular game play (step 306). "Game analytics" is intended to refer to aspects of the game and gaming environment itself, and to distinguish these data from data collected from, by and for the user.

Turning to step 308, once the user bioanalytics and game analytics are obtained, based on these data, an avatar representation of the user in the particular gaming environment is constructed as will be further described. Method 300 then ends (step 310).

In one embodiment, once the user avatar is constructed, the various components of the mechanisms of the illustrated embodiments enable the avatar to continue to learn. However, the avatar remains playable and distributable to other players in the gaming environment and/or elsewhere. These avatars may be loaded into gaming environments to replace typical A.I. "bots," to allow users to interact with play styles that they are familiar with (e.g., their friends and acquaintances), and/or choose the play style (represented by a particular avatar) that they wish. In addition, avatars may be traded and/or distributed as the user (or other "owner) sees fit, to allow for others to partake in a particular multi-player experience.

Figure 4:
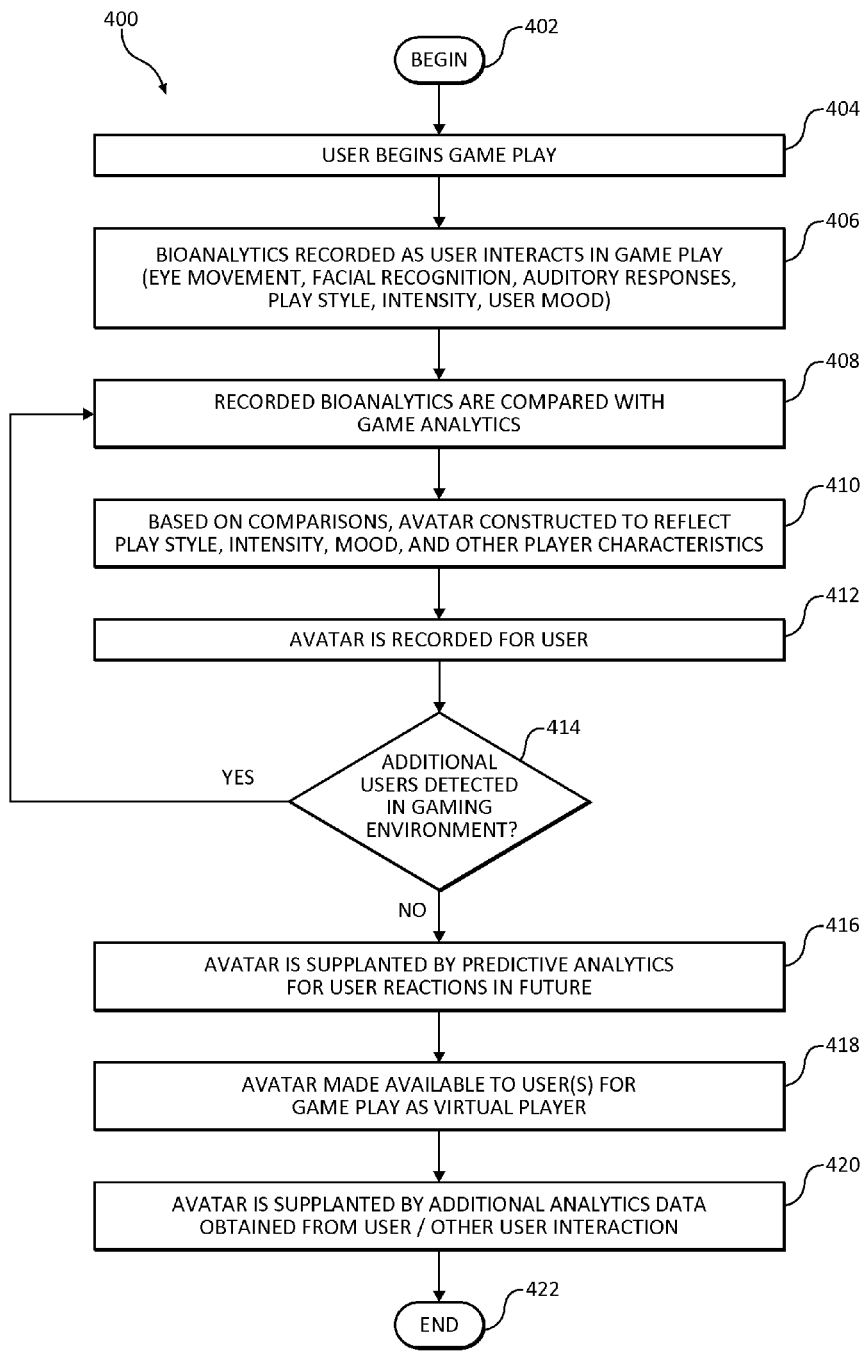
FIG. 4 is a flow chart diagram of an additional exemplary method for fostering integration of a user in a multi-player gaming environment, in which various aspects of the present invention may be implemented.

Turning now to FIG. 4, following, an additional exemplary method 400 for fostering integration of a user in a multi-player gaming environment according to certain aspects of the present invention. Method 400 begins (step 402) as a particular user begins game play (step 404). Various bioanalytics are observed and recorded as the user interacts in the game play (step 404). A number of examples of these bioanalytics have been previously described, but may include without limitation, eye movement, facial recognition, auditory responses, play style, intensity, and user mood.

The recorded bioanalytics are then compared with game analytics (step 408). Based on the various comparisons, an avatar is constructed to reflect play style, intensity, mood and other player characteristics (step 410). The avatar is then saved/recorded for the user (step 412).

In a following decision step, the method 400 queries whether additional users are detected in the gaming environment (step 414). If so, the method 400 returns to step 408 to perform similar functionality for an additional user, moving to perform steps 410 and 412, where an additional avatar for that additional user is constructed. If no other users are detected, the method 400 moves to step 416, where at a subsequent time in the future, the avatar is supplanted by various analytics (such as predictive analytics for user reactions). In addition, sharing properties of the avatar then become apparent in step 418, as the avatar is made available to the user, additional users, or elsewhere for game play as a virtualized player. In step 420, continuing, the avatar is supplanted by additional analytics operations, as data is obtained from the user at a subsequent time, or, in additional embodiments, data is obtained from additional user interaction with the particular user. The method 400 then ends (step 422).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for fostering integration of a user in a multi-player gaming environment by a processor, comprising:
recording each of a plurality of user bioanalytics over a period of time as the user interacts in the multi-player gaming environment by using at least one biometric device to monitor and record user input, the at least one biometric device monitoring at least one of an auditory cue from the user and a visual cue from the user; wherein monitoring the auditory cue further includes monitoring and recording at least one of spoken information and laughter; and further wherein monitoring the visual cue further includes monitoring and recording emotive information based on recognition patterns identified from at least a portion of the user's face;

comparing the recorded bioanalytics against a plurality of game analytics corresponding to aspects of game play in the multi-player gaming environment over the period of time; and based on the bioanalytics and game analytics, constructing an avatar representation of the user for the multi-player gaming environment.

2. The method of claim 1, wherein constructing the avatar representation further includes forming at least one prediction, for the user, of behavior during a certain game analytic in a future multi-player gaming environment.

3. The method of claim 1, wherein recording each of the plurality of user bioanalytics further includes recording a reaction of the user to a certain game analytic at a particular time.

4. The method of claim 1, wherein recording each of the plurality of user bioanalytics further includes recording at least one of a controller movement and play style of the user.

5. The method of claim 1, further including, subsequent to constructing the avatar representation:

making the avatar representation accessible to the user, or additional users, in the multi-player gaming environment for use as a virtual representation of the user, and continuing to perform the recording of the bioanalytics for the avatar representation when the user is present, and comparing the recorded bioanalytics against the game analytics, in order to supplement the construction of the avatar representation over time.

6. A system for fostering integration of a user in a multi-player gaming environment, comprising:

a processor, operational in the multi-player gaming environment, that:

records each of a plurality of user bioanalytics over a period of time as the user interacts in the multi-player gaming environment by using at least one biometric device to monitor and record user input, the at least one biometric device monitoring at least one of an auditory cue from the user and a visual cue from the user; wherein monitoring the auditory cue further includes monitoring and recording at least one of spoken information and laughter; and further wherein monitoring the visual cue further includes monitoring and recording emotive information based on recognition patterns identified from at least a portion of the user's face, compares the recorded bioanalytics against a plurality of game analytics corresponding to aspects of game play in the multi-player gaming environment over the period of time, and based on the bioanalytics and game analytics, constructs an avatar representation of the user for the multi-player gaming environment.

7. The system of claim 6, wherein the processor, pursuant to constructing the avatar representation, forms at least one prediction, for the user, of behavior during a certain game analytic in a future multi-player gaming environment.

8. The system of claim 6, wherein the processor, pursuant to recording each of the plurality of user bioanalytics, records a reaction of the user to a certain game analytic at a particular time.

9. The system of claim 6, wherein the processor, pursuant to recording each of the plurality of user bioanalytics, records at least one of a controller movement and play style of the user.

10. The system of claim 6, wherein the processor, subsequent to constructing the avatar representation:

makes the avatar representation accessible to the user, or additional users, in the multi-player gaming environment for use as a virtual representation of the user, and continues to perform the recording of the bioanalytics for the avatar representation when the user is present, and comparing the recorded bioanalytics against the game analytics, in order to supplement the construction of the avatar representation over time.

11. A computer program product for fostering integration of a user in a multi-player gaming environment by a processor, the computer program product comprising a non-transitory computer-readable storage medium having computer-readable program code portions stored therein, the computer-readable program code portions comprising:

a first executable portion that records each of a plurality of user bioanalytics over a period of time as the user interacts in the multi-player gaming environment by using at least one biometric device to monitor and record user input, the at least one biometric device monitoring at least one of an auditory cue from the user and a visual cue from the user; wherein monitoring the auditory cue further includes monitoring and recording at least one of spoken information and laughter; and further wherein monitoring the visual cue further includes monitoring and recording emotive information based on recognition patterns identified from at least a portion of the user's face;

a second executable portion that compares the recorded bioanalytics against a plurality of game analytics corresponding to aspects of game play in the multi-player gaming environment over the period of time; and a third executable portion that, based on the bioanalytics and game analytics, constructs an avatar representation of the user for the multi-player gaming environment.

12. The computer program product of claim 11, further including a fourth executable portion that, pursuant to constructing the avatar representation, forms at least one prediction, for the user, of behavior during a certain game analytic in a future multi-player gaming environment.

13. The computer program product of claim 11, further including a fourth executable portion that, pursuant to recording each of the plurality of user bioanalytics, records a reaction of the user to a certain game analytic at a particular time.

14. The computer program product of claim 11, further including a fourth executable portion that, pursuant to recording each of the plurality of user bioanalytics, records at least one of a controller movement and play style of the user.

15. The computer program product of claim 11, further including a fourth executable portion that, subsequent to constructing the avatar representation:

makes the avatar representation accessible to the user, or additional users, in the multi-player gaming environment for use as a virtual representation of the user, and continues to perform the recording of the bioanalytics for the avatar representation when the user is present, and comparing the recorded bioanalytics against the game analytics, in order to supplement the construction of the avatar representation over time.

* * * * *